(12) United States Patent
Qiu et al.

(10) Patent No.: US 6,173,252 B1
(45) Date of Patent: Jan. 9, 2001

(54) APPARATUS AND METHODS FOR CHINESE ERROR CHECK BY MEANS OF DYNAMIC PROGRAMMING AND WEIGHTED CLASSES

(75) Inventors: Zhaoming Qiu; Liping Yang, both of Beijing (CN)

(73) Assignee: International Business Machines Corp., Armonk, NY (US)

( * ) Notice: Under 35 U.S.C. 154(b), the term of this patent shall be extended for 0 days.

(21) Appl. No.: 09/018,348

(22) Filed: Feb. 4, 1998

(30) Foreign Application Priority Data

Mar. 13, 1997 (CN) .................................................. 97103125

(51) Int. Cl.$^7$ .............................. G06F 17/27; G06F 17/28
(52) U.S. Cl. .................................. 704/9; 704/10; 707/532
(58) Field of Search ................................. 704/1, 8, 9, 10, 704/2, 4, 7; 707/531, 532, 533, 535, 536

(56) References Cited

U.S. PATENT DOCUMENTS

| | | | |
|---|---|---|---|
| 5,200,893 | * | 4/1993 | Ozawa et al. ......................... 707/531 |
| 5,224,040 | * | 6/1993 | Tou ........................................... 704/2 |
| 5,270,927 | * | 12/1993 | Sproat ................................. 707/535 |
| 5,477,451 | * | 12/1995 | Brown et al. ............................. 704/9 |
| 5,715,469 | * | 2/1998 | Arning ................................. 707/533 |
| 5,761,687 | * | 6/1998 | Hon et al. ............................. 707/531 |
| 5,806,021 | * | 9/1998 | Chen et al. ................................ 704/9 |
| 5,828,991 | * | 10/1998 | Skiena et al. ............................. 704/9 |
| 5,852,801 | * | 12/1998 | Hon et al. ............................. 704/244 |
| 5,893,133 | * | 4/1999 | Chen ................................... 707/535 |
| 6,014,615 | * | 1/2000 | Chen ......................................... 704/3 |

FOREIGN PATENT DOCUMENTS 41-0260968A * 9/1998 (JP).
WO 97/40453 * 10/1997 (WO).

* cited by examiner

Primary Examiner—Joseph Thomas
(74) Attorney, Agent, or Firm—F. Chau & Associates, LLP (57) ABSTRACT

A Chinese error check system comprises: an input device for inputting a sentence to be checked; a regular dictionary storing device for storing regular words and their weights; a special segmentation classes storing device for storing special segmentation classes and their weights; a segmentation device for segmenting an inputted sentence by retrieving the contents of the regular dictionary storing device and the special segmentation class storing device and employing a dynamic programming method to select a most probable segmentation of the inputted sentence; a lone character bigram table storage device for storing the lone character bigram table, the table having the probability of Chinese character pairs being adjacent lone character pairs stored therein; and a segmentation results processing device operatively coupled to the lone character bigram table storage device and the segmentation device for processing the segmentation results and displaying possible errors in the inputted sentence. The system treats commonly committed error strings, names of people, places and organizations, numbers, and combinations of numbers and measure words as ordinary segmentation units along with words in a regular dictionary.

26 Claims, 4 Drawing Sheets

APPARATUS AND METHODS FOR CHINESE ERROR CHECK BY MEANS OF DYNAMIC PROGRAMMING AND WEIGHTED CLASSES

BACKGROUND OF THE INVENTION

1. Technical Field

The present invention relates to sentence segmentation and, more specifically, to apparatus and methods for segmenting a Chinese sentence to detect errors in a Chinese text file.

2. Discussion of Related Prior Art

As computers become more powerful and prevalent, they are relied upon to perform ever increasing tasks. One such task is the detection of errors in a Chinese text file (hereinafter referred to as "Chinese error check").

Errors in a Chinese text file are generally the result of the following: keyboard entry errors, primarily caused by the same or similar input code (e.g., coded by pronunciation or stroke information); commonly committed errors due to insufficient knowledge (e.g., many people may regard "按步就班" as a correct word when, in fact, the correct word should be "按部就班"); grammatical errors (e.g., "高虎區的完成某項工作" should be "高虎量地完成某項工作"; this is the simplest one of its kind).

General approaches to error detection in a Chinese text file include the following three methods: lookup tables; a grammatical rule based method; and a statistical method. The first two methods have their shortcomings. For example, with the first method, it is obvious that no matter how big the table is, only a small fraction of errors can be included. Moreover, many errors are context dependent. Therefore, attempting to identify such errors by a simple comparison will likely result in wrongful identification. Regarding the second method, because of the complexity and the irregularity of Chinese grammar, this method can only serve as a supplement for another method. However, the third or statistical method is a practical method in frequent use today.

In the third method, potential errors are detected based on statistical information pertaining to either the collocation of characters and words or the characters and words themselves. The information is derived from a corpus. Since there is no natural word boundary in Chinese text, it is necessary to implement sentence segmentation. To segment a sentence, a dictionary is necessary. Traditionally, segmentation has been done non-statistically, by matching a string of characters in a sentence with the longest word in a dictionary. However, this third method does not and, in fact, is unable to treat ambiguities.

However, due to the rapid development of computers, segmentation by using statistical information of words is becoming increasingly popular. This method requires frequency information for each entry of the dictionary. The frequency information is a figure (hereinafter referred to as a "weight") that represents the probability of a word appearing in the corpus. A method known as dynamic programming is used to determine the most probable segmentation based on the dictionary and the frequency information. The most probable segmentation is a partition such that the product of the weights of all its segmentation units is the largest among all possible ways of partitioning. It should be emphasized that the dynamic programming method is usually used in segmentation or part of speech tagging. Thus, all of the resulting segmentation units are entries of the dictionary in use.

The prior art includes two different methods for detecting errors in a Chinese text file using the statistical approach. In the first method, the sentence to be checked is not segmented. Instead, bigram statistical information (the weights) of the Chinese characters are applied directly to the collocation of any two successive characters of the sentence. Any two successive characters having a bigram weight smaller than a predetermined threshold will be regarded as a potential error. Otherwise, they are considered as legitimate collocations.

The second method consists of three main steps. First, a segmentation is implemented according to a given dictionary. The traditional longest match method with forward or backward scanning is usually adopted. Second, if predefined error libraries exist, neighboring segmentation units are recombined. A searching process will then determine if there are any matches with the entries of the predefined error libraries in the recombined units. Such matches will be regarded as potential errors. Third, for lone characters left out after such analysis (lone characters are those that stand alone in a resulting segmentation unit), a predefined threshold is applied. If the stand-alone weight of a lone character, derived from a corpus, is smaller than the threshold, the lone character will be regarded as a potential error.

In some research papers, the dynamic programming method was used to implement segmentation for Chinese sentences in terms of a regular dictionary with statistical information for each entry. However, this method is not suitable for the task of detecting errors in a Chinese text file. This is because the dynamic programming method is only used on "regular" words of the dictionary. Pre-defined errors (common errors committed by ordinary people), names, numbers, measure words, etc., are treated separately. The order in processing these different units may lead to distinct segmentation units. Classes can get entangled such that the leading or end character of a class not yet treated may be bound to other characters to form a unit of another class that is being treated. This entanglement results in erroneous segmentation, leading to a lower error detection rate and, more particularly, to a higher false alarm rate. For example, given the sentence: "李大明天天上班" (Li Da-Ming goes to work every day), the correct segmentation should be: "李大明|天天|上班". However, according to the prior art, it would be segmented as follows: "李|大|明天|天|上班". Since "李大" is not a popular name, it may be spotted as a possible error. In particular, if this situation occurs with respect to a pre-defined error (that is, the predefined error is not segmented as a segmentation unit), the error may not be detected.

Thus, in implementing the statistical method, it would be highly advantageous to have all segmentation units determined uniformly in terms of statistical information derived from a corpus. In this way, all the classes (e.g., regular words, pre-defined errors, names, numbers, and measure words) would be treated on equal footing.

SUMMARY OF THE INVENTION

It is an object of the present invention to provide a method for Chinese sentence segmentation that treats commonly committed error strings, names of people, places and organizations, numbers, and combinations of numbers and measure words as ordinary segmentation units along with words in a regular dictionary.

Another object of the present invention is to provide a Chinese error check system having the highest error detection rate while keeping the false alarm rate the lowest, relative to conventional systems utilized for similar applications.

In one aspect of the present invention, a method of segmenting a Chinese sentence comprises: defining a plurality of classes for segmentation, along with words in a regular dictionary; assigning weights to the classes, relative to that of the words in the regular dictionary; and selecting a segmentation output conformable to a certain condition by means of dynamic programming.

In another aspect of the present invention, a Chinese error check system comprises: an input device for inputting a sentence to be checked; a regular dictionary storing device for storing regular words and their weights; a special segmentation classes storing device for storing special segmentation classes and their weights; a segmentation device for segmenting an inputted sentence by retrieving the contents of the regular dictionary storing device and the special segmentation class storing device and employing a dynamic programming method to select a most probable segmentation of the inputted sentence; a lone character bigram table storage device for storing the lone character bigram table, the table having the probability of Chinese character pairs being adjacent lone character pairs stored therein; and a segmentation results processing device operatively coupled to the lone character bigram table storage device and the segmentation device for processing the segmentation results and displaying possible errors in the inputted sentence.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention provides an improved, integrated dynamic programming method for selecting the most likely segmentation of sentences in a Chinese Error Check (CEC) System. This method treats commonly committed error strings, names of people, places and organizations, numbers, and combinations of numbers and measure words as ordinary segmentation units along with words in a regular dictionary, and assigns appropriate weights to them.

Since classes such as pre-defined errors, names, numbers, and measure words are also regarded as segmentation units, if their respective weights are correct statistically, the segmentation will be correct in the statistical sense. This serves the purpose of detecting incorrect collocations. However unlike words in a regular dictionary, it is impractical to get statistical information for all units of these classes from a corpus (a balanced corpus with infinite size is required for this purpose). Therefore, a rough approximation is utilized in the illustrative embodiment of the present invention, i.e., each class mentioned above is given an appropriate weight. This weight represents the affinity of characters in a unit of that class. If the weight is too big, a neighboring character may be incorrectly drawn to form a unit of that class. If the weight is too small (the prior art method is an extreme case with the weight of a class considered later being 0 relative to a class considered earlier), a character belonging to a unit of this class may be incorrectly drawn by neighboring character(s) to form a unit of another class or a regular word. Therefore, the weight has to be selected to optimize the result. This is achieved by repeating the following trial and error processes: running large amounts of test files, tracing the segmentation errors, adjusting the weights of the various classes, and running the test files again.

Figure 1:
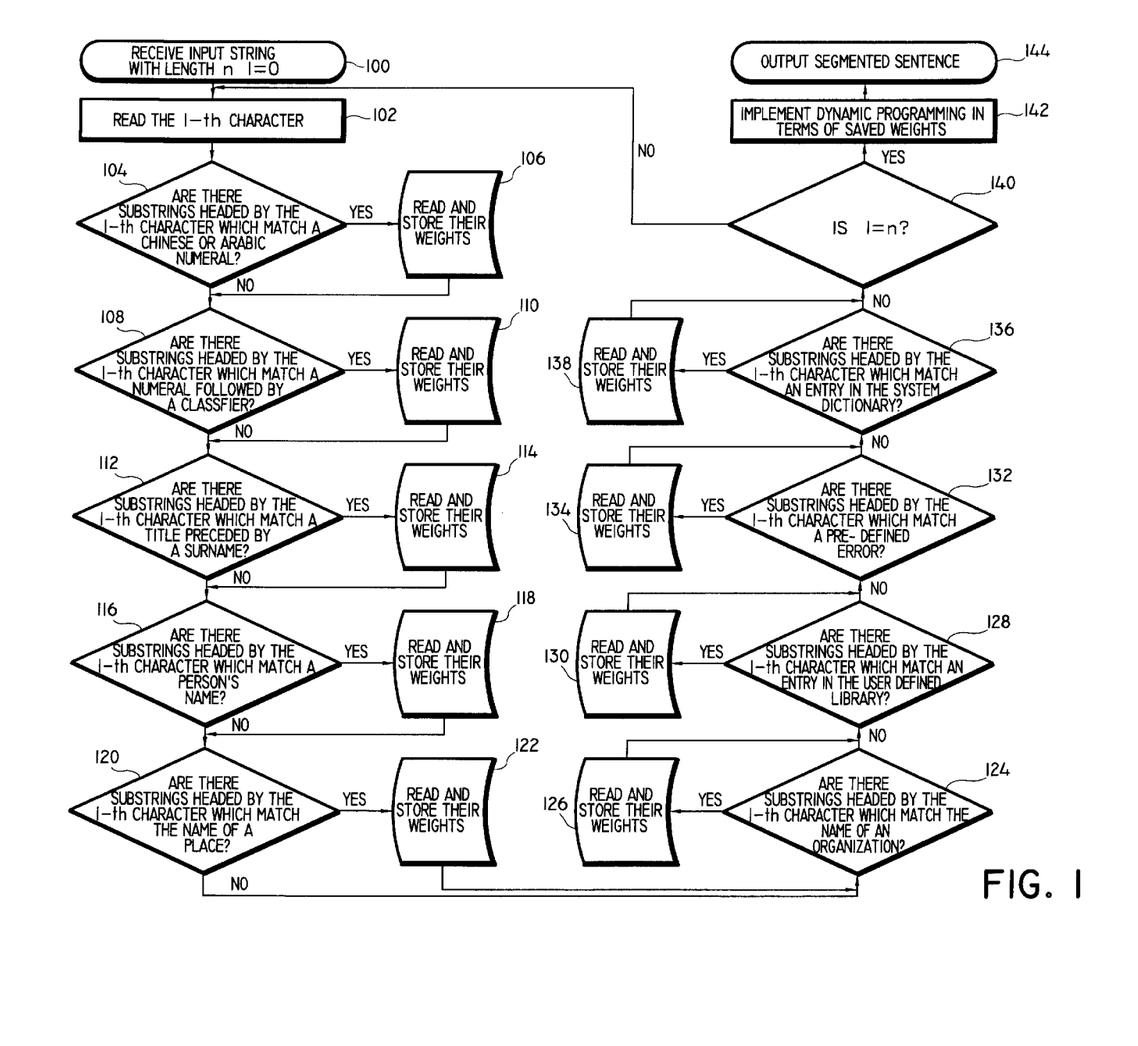
FIG. 1 is a flowchart of a Chinese sentence segmentation process according to an embodiment of the present invention.

FIG. 1 is a flowchart of a Chinese sentence segmentation process according to an embodiment of the present invention. In the illustrative embodiment of FIG. 1, the following classes were considered as possible segmentation units, along with entries of a regular dictionary: (a) predefined errors (i.e., commonly committed errors); (b) user defined library; (c) Chinese names; (d) translated names; (e) a title preceded by a surname; (f) numbers; and (g) numbers followed by a measure word.

(a) Predefined Errors

Some predefined errors are so subtle that even when people are told there is an error, they may still be unable to find the correct substitute. Hence candidates are provided for them. An appropriate weight (see Table 1) is assigned to this class such that predefined errors will be correctly identified in most circumstances of context.

TABLE 1

Appropriate Weights adopted in CEC System

| ITEM | Logarithm of the Weight |
| --- | --- |
| Chinese Name (2 characters) | −15 |
| Chinese Name (more than 2 characters) | −19 |
| Translated Names (2 characters) | −15 |
| Translated Names (more than 2 characters) | −19 |
| A Title Preceded by a Surname | −16 |
| Number | −9 |
| A Number Followed by a Measure Word | −11 |
| Commonly Committed Errors | −12.5 |
| " "(a reference word in the dictionary for comparison) | −6 |

(b) User Defined Library

The user can define either "correct strings" (i.e., strings that the user does not want the CEC system to mis-identify as an error, such as, for example, technical terminology) or "wrong strings" (i.e., strings that must be detected according to the user's requirements).

(c) Chinese Names

Chinese names are identified according to the procedures defined below. A group of popular surnames is selected. They are divided into three sub-groups with ranks of 1, 2, and 3, respectively, according to increasing popularity. In order to include as many surnames as possible while keeping away from disturbing the segmentation for normal words, some surnames which are not that popular are also included. However, these surnames have a very weak capability for forming a word with other characters.

Also, a group of popular second characters in Chinese names and a group of popular last characters in Chinese names are selected separately (for a given name with only one character, that character will be considered as the last character rather than the second character). The characters in these two groups are also divided into three sub-groups with ranks of 1, 2, and 3, respectively, according to increasing popularity. There are 220, 351, and 606 characters in these three groups, respectively. Two-character surnames are listed separately. The selection of these characters is in terms of statistics based on a huge list of Chinese names.

Consequently, a three-character string is considered to be a name if the first character is in the surname group, the second and the third characters are in their respective groups, and the sum of the ranks of all three characters is bigger than a pre-determined number. Also, a two-character string is considered to be a name if the first character is in the surname group, the second character is in the last character group, and the sum of the ranks of the two characters is higher than another pre-determined number. Appropriate weights (see Table 1) are assigned to the three-character name and two-character-name groups, respectively, such that Chinese names will be correctly identified in most circumstances of context.

(d) Translated Names

Translated names are identified according to the procedures defined below. A group of head characters is selected. If a string is considered to be a translated name, its first character must be in this group.

Also, a group of middle characters is selected. If a string is considered to be a translated name, its middle character(s), no matter how many they are, must be in this group.

Moreover, a group of end characters is selected. If a string is considered to be a translated name, its last (end) character must be in this group. An appropriate weight (see Table 1) is assigned such that translated names will be correctly identified in most circumstances of context.

(e) A Title Preceded By a Surname

A group of popular surnames and a group of titles are selected. If a string's first character matches one in the surname group and its subsequent characters match one in the title group, that string will be identified as a unit in this class. An appropriate weight (see Table 1) is assigned to all units of this class such that they will be correctly identified in most circumstances of context.

(f) Numbers

Legitimate combinations of Arabic and Chinese numerals will be given an appropriate weight (see Table 1) such that they will be correctly identified in most circumstances of context.

(g) Numbers Followed By a Measure Word

A group of popular measure words is selected. If a string is a legitimate combination of Arabic or Chinese numerals followed by a character in the measure word group, that string will be identified as a unit in this class. The system will perform a legitimacy check on some measure words, for example, year-month-date and hour-minute-second. An appropriate weight (see Table 1) is assigned to all units of this class such that they will be correctly identified in most circumstances of context.

The same principle is also applicable to names of places and names of organizations. However, it is to be appreciated that the details of varying embodiments of the present invention may be varied. For example names with higher ranks can be given higher weights, etc. The criterion for all these choices (i.e., variations) is to make the correct segmentation rate as high as possible when running the test files.

With the weights of these special classes of segmentation units determined, segmenting a sentence can be done by performing the steps shown in FIG. 1. Thus, an input string is received with length n (step 100). At this point, a counter that counts the number of characters of the string is set to zero (0).

Next, read the 1-th character, where 1 is the variable used by the counter to iteratively identify each character of the string (step 102). Then, determine if there are substrings headed by the 1-th character which match a Chinese or Arabic numeral (step 104). If so, read and store their weights (step 106).

In any event, determine if there are substrings headed by the 1-th character which match a numeral followed by a classifier (step 108). If so, read and store their weights (step 110).

In any event, determine if there are substrings headed by the 1-th character which match a title preceded by a surname (step 112). If so, read and store their weights (step 114).

In any event, determine if there are substrings headed by the 1-th character which match a person's name (step 116). If so, read and store their weights (step 118).

In any event, determine if there are substrings headed by the 1-th character which match the name of a place (step 120). If so, read and store their weights (step 122).

In any event, determine if there are substrings headed by the 1-th character which match the name of an organization (step 124). If so, read and store their weights (step 126).

In any event, determine if there are substrings headed by the 1-th character which match an entry in the user defined library (step 128). If so, read and store their weights (step 130).

In any event, determine if there are substrings headed by the 1-th character which match a predefined error (step 132). If so, read and store their weights (step 134).

In any event, determine if there are substrings headed by the 1-th character which match an entry in the system dictionary (step 136). If so, read and store their weights (step 138).

Then, determine if 1=n (i.e., the last character processed is the last character of the string) (step 140). If 1≠n, then return to step 102 and perform the corresponding operations for the next character. However, if 1=n, then implement dynamic programming in terms of the saved weights (step 142). Then, output the segmented sentence (step 144).

The following is an example of how dynamic programming works using the following Chinese text string: "发展中国兔饲养业是杨克家教授毕生奋斗的三项目标之一." (To develop the rabbit breeding in China is one of the three tasks to which Professor Yang Ke-Jia devoted himself.)

The method of the present invention will store the following in the RAM (the number within the parenthesis is the weight of the character's (or word's) preceding character (or word), which is the logarithm of the corresponding probability derived from a corpus):

发 (−8.128196), 发展 (−5.087423), 发展中国家 (−12.059752);

展

中

国

家 (−9.252900);

(−5.670415), 中国 (−5.018170);

(−7.712590), 国家 (−6.258107);

(−6.688566), 家兔 (−13.914123);

兔

饲 (−12.145970);

(−12.591735), 饲养 (−10.619526);

养 (−8.815591);

业 (−7.532310);

是 (−4.688606);

杨 (−8.354508), 杨克 (−15.000000, a name), 杨克家 (−19.000000, a name);

克 (−8.754861);

家 (−6.688566), 家教 (−12.899220);

教 (−9.393462), 教授 (−8.597861);

授 (−11.255703);

毕 (−10.485690), 毕生 (−12.116842);

生 (−8.073256);

奋 (−11.578353), 奋斗 (−9.443534);

斗 (−10.529599);

的 (−2.992376);

三 (−6.314594), 三项 (−11.000000, number and classifier);

项 (−7.303765);

目 (−10.329155), 目标 (−7.828054);

标 (−9.287221);

之 (−6.617377), 之一 (−8.205917);

一 (−4.711594).

The dynamic programming algorithm evaluated the sum of different segmentations and selected the one with the highest weight as the most probable segmentation. In the above example, we have 发展|中国|家兔|饲养|业|是|杨克家|教授|毕生|奋斗|的|三项|目标|之一 with the sum of weights equal to −126.234788.

The segmentation result will reveal part of the errors, that is, those units that match with entries of predefined errors and user defined libraries ("wrong strings"). Other possible errors can be detected by using the lone character bigram check, which checks the collocation of two successive lone characters after the segmentation.

A general Chinese character bigram table is a table in which the probability of two Chinese characters appearing in a corpus in a given order successively is assigned to that ordered pair. The bigram table contains the probabilities of all Chinese character pairs appearing in a corpus in the above mentioned orderly neighboring manner. In Chinese error check, the probability is just a value which indicates the number of times the orderly neighboring pair appears in a corpus. Most Chinese error check systems make use of a Chinese character bigram table to check if two Chinese characters are allowed to be an orderly neighboring pair in the text. If the number corresponding to this pair in the bigram table is too small, one or both characters have probably been incorrectly inputted.

In a multi-character word, any single character error may cause the word to be segmented into lone characters. This is one of the most commonly committed errors in a Chinese text file. The lone character bigram of the present invention is a special bigram which can effectively detect incorrectly used (inputted) Chinese characters.

In the lone character bigram of the present invention, only the orderly neighboring pairs are counted. Neither character of the pair is part of a multi-character word. The difference between the lone character bigram and the general character bigram is that the counting in the lone character bigram is conducted on a segmented corpus. More specifically, after the segmentation of all sentences in a corpus, the orderly neighboring lone character pairs are counted.

Figure 2:
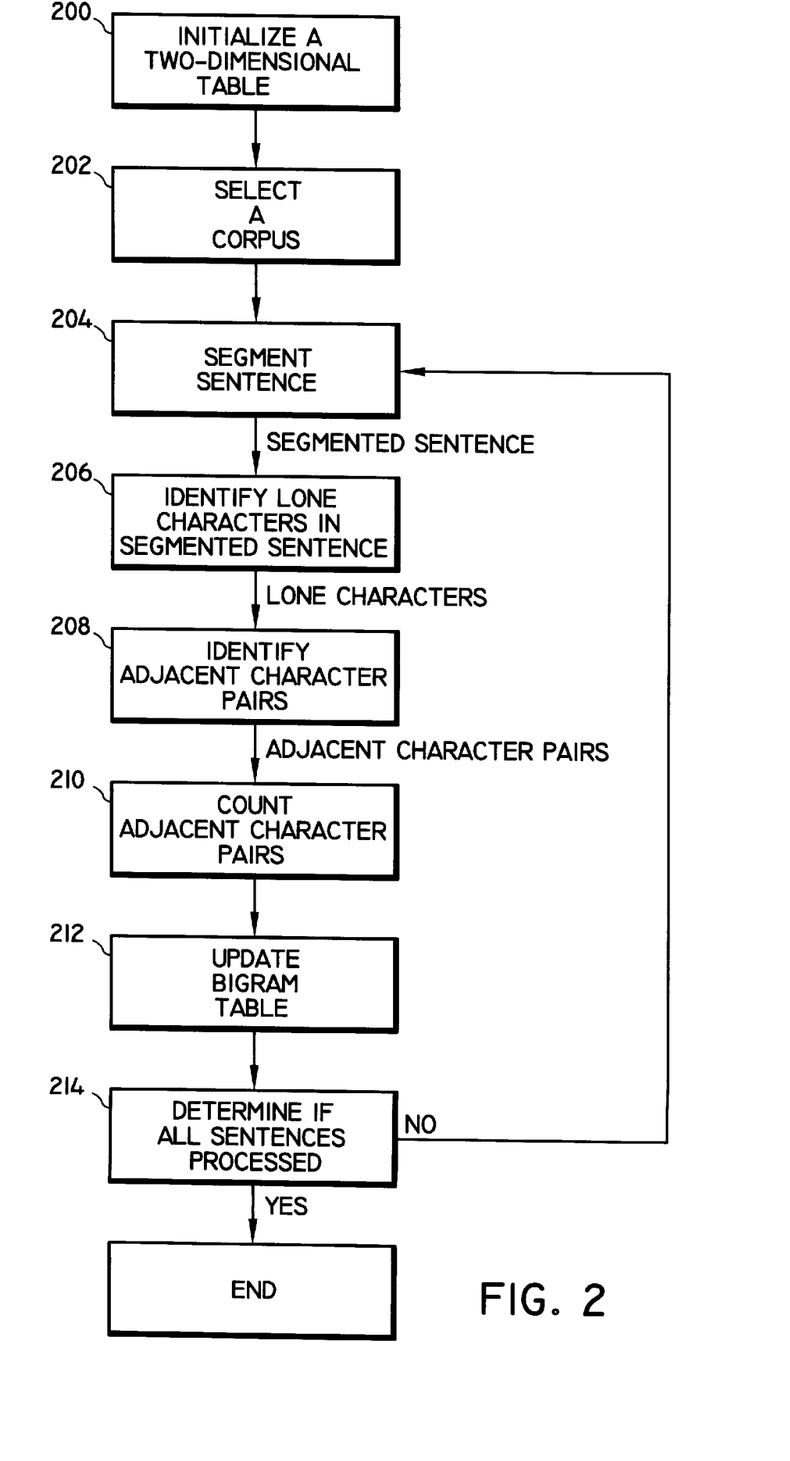
FIG. 2 is a flowchart for establishing a bigram table of lone characters according to an embodiment of the present invention.

FIG. 2 is a flow chart illustrating the establishment of a lone character bigram table according to an embodiment of the present invention. The lone character bigram table (it only counts the orderly neighboring lone character pairs in a segmented sentence) is established according to the steps described below. First, initialize a two-dimensional table (step 200). Next, select a corpus (step 202). Then, segment a sentence in the selected corpus starting with the first sentence (step 204). Subsequently, identify the lone characters in the segmented sentence (step 206). Consequently, identify the adjacent character pairs (i.e., orderly neighboring lone character pairs) (step 208). Next, count the adjacent lone character pairs (step 210). Then, update the corresponding values of these adjacent lone-character pairs in the bigram table (step 212). Subsequently, determine if all sentences of the corpus have been processed (step 214). If all sentences of the corpus have not been processed, repeat steps 204 through 214 for the next sentence until all sentences of the corpus have been processed. The lone character bigram table thus established is about one quarter the size of the general character bigram table.

According to an embodiment of the present invention, the error check using the lone character bigram table is described below, first generally, and then specifically with reference to FIG. 3. First, the sentence to be checked is segmented. Next, it is determined if there are any neighboring lone character pairs. If so, check the lone character bigram table for the corresponding number. If the number is smaller than a predefined threshold, this pair will be marked as a possible error. Thus, this is a statistical method. The key idea behind the method is that if an orderly neighboring lone character pair rarely appears in a corpus, it is very probable that a wrong Chinese character(s) has been inputted.

Figure 3:
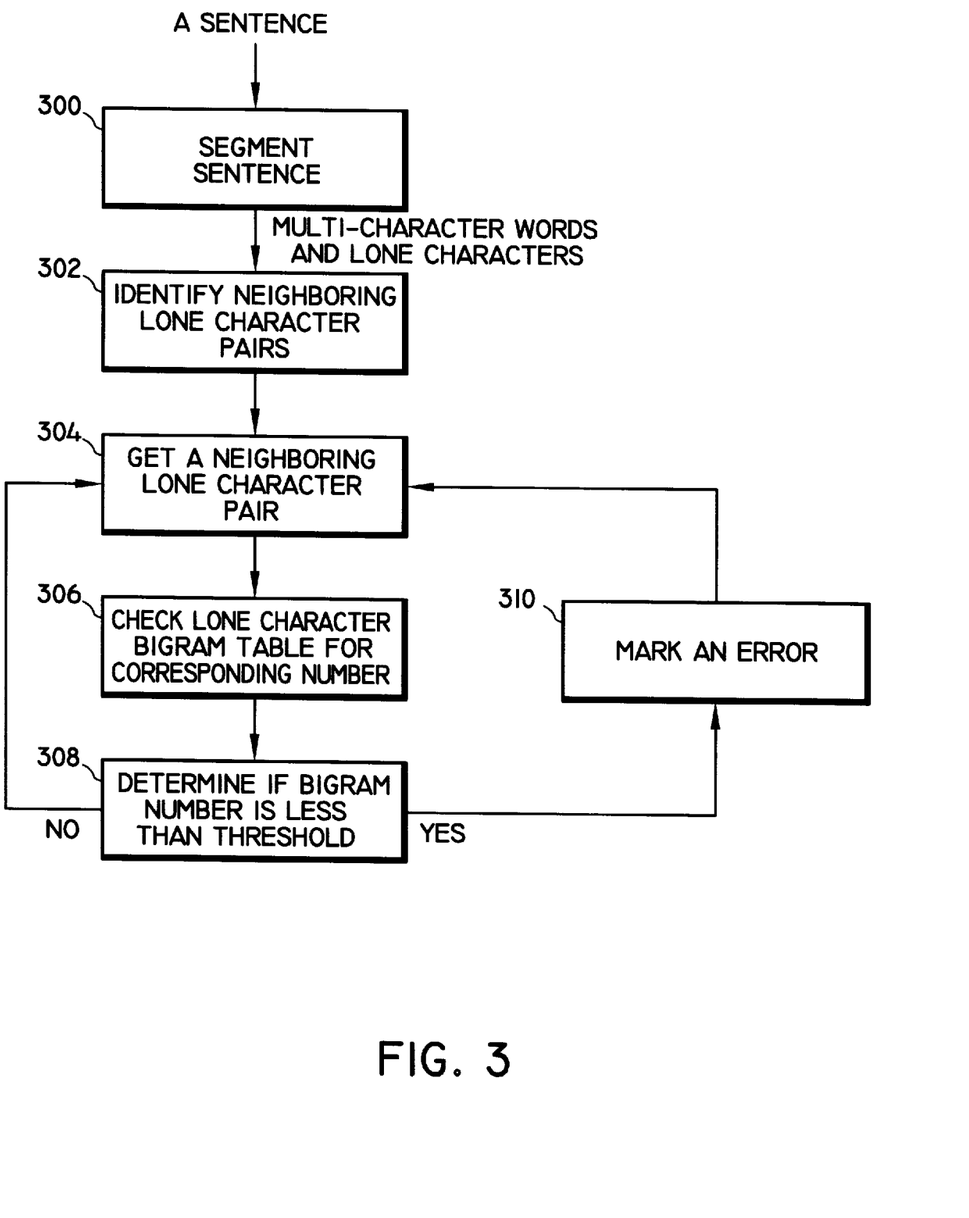
FIG. 3 is a flowchart for detecting incorrect lone character collocations according to an embodiment of the present invention.

FIG. 3 is a flow chart illustrating using the lone character bigram table established according to the present invention to detect incorrect lone character collocations according to an embodiment of the present invention. Referring to FIG. 3, first, segment a sentence by utilization of the integrated dynamic programming method of the present invention (step 300). The resulting segmentation units may include both multi-character units and lone character units.

Next, identify adjacent lone character pairs (i.e., orderly neighboring lone character pairs) (step 302). Then, get an adjacent lone character pair (step 304). Consequently, check the lone character bigram table for a corresponding value (i.e., the number of times the adjacent lone character pair appears in a corpus) (step 306).

Subsequently, determine if the bigram value (from step 306) is less than a predefined threshold (step 308). If so, mark an error (step 310). In any event, return to step 304 and perform the corresponding operations for the next adjacent lone character pair.

Compared with the general character bigram method, the lone character bigram method only takes the neighboring lone character pairs into account. This greatly reduces the size of the character bigram table and greatly increases the potential for recognizing actual errors. For example, "近代" can hardly appear as an orderly neighboring lone character pair in a correct sentence. But as a general orderly neighboring character pair, it appears very often in newspaper, because there is such a high frequency combination "先进代表".

Figure 4:
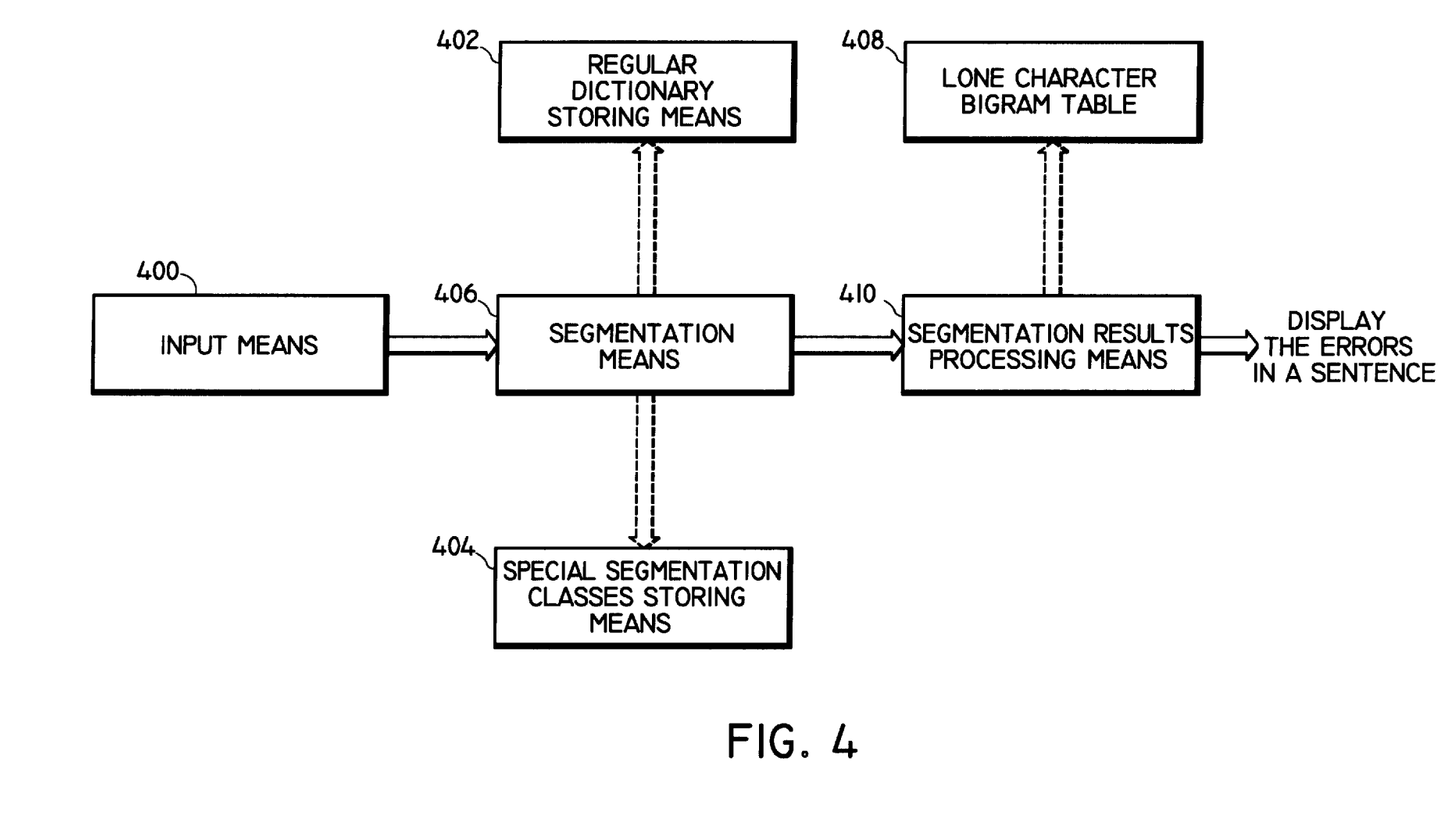
FIG. 4 is a block diagram of a Chinese error check system according to an embodiment of the present invention.

FIG. 4 is a block diagram of a Chinese error check system according to an embodiment of the present invention. The system is based on the integrated dynamic programming method and the lone character bigram table. Referring to FIG. 4, the Chinese error check system includes input means 400 for inputting sentences to be checked. A regular dictionary storing means 402 is included for storing regular words and their weights. Additionally, special segmentation classes storing means 404 is included for storing special segmentation classes (e.g., commonly committed errors, names of people, places or organizations, numbers, combinations of number and measure words, user defined libraries, etc.) and their weights. Also included is segmentation means 406 for segmenting an inputted sentence by retrieving the contents of the regular dictionary storing means 402 and the special segmentation class storing means 404 and then employing a dynamic programming method to select the most probable segmentation of the inputted sentence. The system also consists of a lone character bigram table storage means 408 for storing the lone character bigram table in which the probability of all Chinese character pairs being neighboring lone character pairs are saved. Also included is segmentation results processing means 410 operatively coupled to the lone character bigram table storage means 408 and the segmentation means 406 for processing the segmentation results and displaying possible errors in the inputted sentence. The possible errors include commonly committed errors and user defined errors as well as errors detected by the lone character bigram method.

Upon startup of the CEC system of the present invention, the RAM will be initialized and all data needed by the system will be loaded into memory. This data includes the main dictionary (system dictionary), the pre-defined error list, the user defined library, the character bigram table and their indices, a word-character-word table (here 'word' means a multi-character word, thus, this table contains the statistical information pertaining to whether a given character can be between two multi-character words), a head character table and an end character table. The head character and end character tables contain the statistical information pertaining to whether a given character can be the first or the last character of a sentence, respectively. Other data (the classifiers, character groups for name, organizations and places, title list and their respective weights) is integrated into the program itself (i.e., it is automatically loaded). All of the above data (excluding the user defined library) will need about 1.5 MB of memory in a compressed version. The fact that all the data can be uploaded into the RAM makes the system operate extremely fast.

A comparison of the capability for identifying names between the CEC system of the present invention and two existing leading local products (Product 1 and Product 2) is illustrated in Table 2. Additionally, a comparison of the performance in terms of the number of errors present, the number of errors detected, and the number of false alarms between the inventive CEC system and the two products, is illustrated in Table 3. The sample file utilized for Table 3 contained 31,000 characters.

TABLE 2

|  | Total No. of names in test file | False alarm |
|---|---|---|
| CEC | 60 | 8 |
| Product 1 | 60 | 14 |
| Product 2 | 60 | 18 |

Comparison of the capability for identifying names with two leading local products

TABLE 3

|  | No. of Errors | Detected | False Alarm |
|---|---|---|---|
| CEC | 369 | 291 | 467 |
| Product 1 | 369 | 259 | 638 |
| Product 2 | 369 | 262 | 1017 |

Performance comparison

It is to be appreciated that the main functional components (e.g., special segmentation classes storing means 404, the segmentation means 406, the lone character bigram table 408, and the segmentation results processing means 410) illustrated in FIG. 4 are functional in nature and, thus, may be implemented in hardware, software or a combination thereof. In preferred embodiments, apparatus and methods of the present invention may be implemented as software modules on one or more appropriately programmed general purpose computers having a processor(s), memory and input/output interfaces associated therewith for executing the functions associated with the main components of the invention. Of course, special purpose processors may be employed. Given the teachings provided herein, one of ordinary skill in the art will contemplate various other implementations of the functional components of the present invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for segmenting a Chinese text sentence, comprising the steps of:

defining a plurality of classes for segmentation, along with words in a regular dictionary;

assigning weights to the classes, relative to that of the words in the regular dictionary; and selecting a segmentation output conformable to a certain condition by means of dynamic programming.

2. The method of claim 1, wherein the plurality of classes are selected from the group consisting of commonly committed errors, names of people, names of places, names of organizations, a title preceded by a surname, numbers, combinations of numbers and measure words, and a user defined library.

3. The method of claim 2, wherein the names of people class comprises a Chinese names sub-class.

4. The method of claim 3, wherein the selection of names in the Chinese names sub-class comprises the steps of:

(a) selecting a group of popular Chinese surnames;

(b) dividing the group into three sub-groups with ranks of 1, 2, and 3, respectively, according to increasing popularity;

(c) separately selecting a group of popular second characters in Chinese names and a group of popular last characters in Chinese names;

(d) dividing the characters in the popular second characters and popular last characters groups into three sub-groups with ranks of 1, 2, and 3, respectively, according to increasing popularity;

(e) considering a three-character string to be a name if the first character is in the surname group, the second character is in the second characters group and the third character is in the last characters group, and the sum of the ranks of all three characters is more than a pre-determined number; and (f) considering a two-character string to be a name if the first character is in the surname group, the second character is in the last character group, and the sum of the ranks of the two characters is more than another pre-determined number.

5. The method of claim 4, wherein the character in a name having only one character is considered as the last character.

6. The method of claim 2, wherein the names of people class further comprises a translated names sub-class.

7. The method of claim 6, wherein the selection of names in the translated names sub-class comprises the steps of:
(a) selecting a group of head characters;
(b) considering a string to be a translated name only if the string's first character is in the head characters group;
(c) selecting a group of middle characters;
(d) considering a string to be a translated name only if the string's middle characters, no matter how many, are in the middle characters group;
(e) selecting a group of end characters; and
(f) considering a string to be a translated name only if the string's end character is in the end characters group.

8. The method of claim 2, wherein the selection of names in the title preceded by a surname class comprises the steps of:
(a) selecting a group of popular surnames and a group of titles; and
(b) considering a string to be in the title preceded by a surname class only if the string's first character matches a character in the surname group and the string's subsequent characters match characters in the title group.

9. The method of claim 1, wherein the selecting step further comprises the step of selecting a segmentation in which the corresponding product of the weights of all segmentation units is the largest among all possible segmentations.

10. The method of claim 1, wherein the weight represents the affinity of characters in a unit of a particular class.

11. The method of claim 1, wherein the assigning step further comprises:
running test files;
tracing segmentation errors;
adjusting the weights of the plurality of classes; and
re-running the test files.

12. A method for segmenting a Chinese text sentence, comprising the steps of:
(a) defining a plurality of classes for segmentation, along with words in a regular dictionary;
(b) assigning weights to the classes, relative to that of the words in the regular dictionary;
(c) receiving an input string;
(d) reading a character of the input string;
(e) determining if there are substrings headed by the character which match one of the plurality of classes;
(f) reading and storing their weights when there is a match;
(g) repeating steps (c) through (f) for all characters of the string;
(h) implementing dynamic programming in terms of the saved weights to obtain the segmented sentence; and
(i) outputting the segmented sentence.

13. The method of claim 12, wherein the plurality of classes are selected from the group consisting of commonly committed errors, names of people, names of places, names of organizations, a title preceded by a surname, numbers, combinations of numbers and measure words, and a user defined library.

14. A Chinese text error check method, comprising the steps of:
defining a plurality of classes for segmentation, along with words in a regular dictionary;
assigning weights to the classes, relative to that of the words in the regular dictionary;
selecting a segmentation output conformable to a certain condition by means of dynamic programming; and
detecting an error by using a lone character bigram table.

15. The method of claim 14, wherein the plurality of classes are selected from the group consisting of commonly committed errors, names of people, names of places, names of organizations, a title preceded by a surname, numbers, combinations of numbers and measure words, and a user defined library.

16. The method of claim 15, further comprising the steps of:
identifying segmentation units belonging to the class of commonly committed errors as potential errors in the sentence; and
identifying an error detected by using the lone character bigram table as a potential error in the sentence.

17. The method of claim 14, wherein the selecting step further comprises the step of selecting a segmentation in which the corresponding product of the weights of all segmentation units is the largest among all possible segmentations.

18. The method of claim 14, wherein the lone character bigram table is a two-dimension table from which a lone character bigram value can be obtained, the lone character bigram value being the probability of two lone characters being adjacent in a corpus, the establishment of the lone character bigram table comprising the steps of:
(a) initializing the two-dimensional table;
(b) selecting the corpus;
(c) segmenting a sentence in the selected corpus;
(d) identifying the adjacent lone character pairs;
(e) counting the adjacent lone character pairs;
(f) updating the corresponding bigram value of these adjacent lone character pairs in the bigram table;
(g) determining if all sentences of the corpus have been processed; and
(h) repeating steps (c) through (g) until every sentence of the corpus has been processed.

19. The method of claim 18, further comprising the step of identifying the lone characters in the segmented sentence before the step of identifying the adjacent lone character pairs.

20. The method of claim 18, wherein the segmented sentence is the first sentence in the selected corpus.

21. The method of claim 14, wherein the step of detecting an error by using a lone character bigram table further comprises the steps of:
(a) segmenting a sentence;
(b) identifying adjacent lone character pairs;
(c) getting an adjacent lone character pair;
(d) checking the lone character bigram table for a bigram value;
(e) determining if the bigram value of step (d) is less than a predefined threshold;
(f) marking an error when the bigram value is less than the predefined threshold; and
(g) returning to step (c) and perform the corresponding operations for the next adjacent lone character pair.

22. The method of claim 21, wherein the bigram value of an adjacent lone character pair is the number of times the adjacent lone character pair appears in the corpus.

23. A Chinese text error check system, comprising:
input means for inputting a Chinese text sentence to be checked;

regular dictionary storing means for storing regular words and their weights;

special segmentation classes storing means for storing special segmentation classes and their weights;

segmentation means for segmenting an inputted sentence by retrieving the contents of the regular dictionary storing means and the special segmentation class storing means and employing a dynamic programming method to select a most probable segmentation of the inputted sentence;

lone character bigram table storage means for storing the lone character bigram table, the table having a probability of Chinese character pairs being adjacent lone character pairs stored therein; and segmentation results processing means operatively coupled to the lone character bigram table storage means and the segmentation means for processing the segmentation results and displaying possible errors in the inputted sentence.

24. The Chinese error check system of claim 23, wherein possible errors detected by the system comprise:

commonly committed errors; and errors detected by utilizing a lone character bigram method.

25. The Chinese error check system of claim 24, wherein possible errors detected by the system further comprise user defined errors.

26. The Chinese error check system of claim 23, wherein the plurality of special segmentation classes are selected from the group consisting of commonly committed errors, names of people, names of places, names of organizations, a title preceded by a surname, numbers, combinations of numbers and measure words, and a user defined library.

* * * * *